US012806758B2

(12) United States Patent
Heater

(10) Patent No.: US 12,806,758 B2
(45) Date of Patent: Nov. 24, 2026

(54) TOOL DOCKING STATION

(71) Applicant: Joseph Lee Heater, Leesburg, VA (US)

(72) Inventor: Joseph Lee Heater, Leesburg, VA (US)

( * ) Notice: Subject to any disclaimer, the term of this patent is extended or adjusted under 35 U.S.C. 154(b) by 238 days.

(21) Appl. No.: 18/816,549

(22) Filed: Aug. 27, 2024

(65) Prior Publication Data

US 2026/0061587 A1 Mar. 5, 2026

(51) Int. Cl.
*B25H 1/10* (2006.01)
*B25H 1/00* (2006.01)
*B25H 1/12* (2006.01)

(52) U.S. Cl.
CPC ............. *B25H 1/10* (2013.01); *B25H 1/0042* (2013.01); *B25H 1/12* (2013.01)

(58) Field of Classification Search
CPC ........................................................ B25H 1/10
See application file for complete search history.

(56) References Cited

U.S. PATENT DOCUMENTS 5,873,463 A * 2/1999 Purcell .................. B25H 3/023 312/902
7,926,523 B2 4/2011 Williams et al.
9,925,597 B2 3/2018 Tiefenbock et al.
11,602,836 B1 * 3/2023 Hartley, Jr. .............. B25H 1/02
2012/0217276 A1 * 8/2012 Kennedy ................ B25H 3/022 224/400

FOREIGN PATENT DOCUMENTS

TW M646673 U 10/2023

OTHER PUBLICATIONS

Joseph Lee Heater, Tool Docking Station, US Design Non-provisional Application, filed on Aug. 27, 2024.

* cited by examiner

*Primary Examiner* — Kyle A Cook
(74) *Attorney, Agent, or Firm* — Stonebridge IP, PLLC

(57) ABSTRACT

In embodiments, a tool docking station includes a base, a mounting frame attached to the base including a hinge comprising a beveled, rounded, or concave edge, a coupling plate including a beveled, concave, or rounded edge, and a latch mechanism holding the mounting frame to the coupling plate. A method of docking tools via the tool docking station includes attaching a tool or device to a coupling plate, attaching the coupling plate to the base within the mounting frame, and securely holding the coupling plate to the base with the frame and the latch mechanism.

5 Claims, 3 Drawing Sheets

TOOL DOCKING STATION

BACKGROUND

Technical Field of the Invention

The field of the invention relates to products for mounting and dis-mounting tools quickly, easily, and securely.

Description of the Related Art

A long-standing need exists, for example, in woodworking, but also in other areas, for a product that can securely and conveniently hold tools that are actively being used in a project. Frequently, when attempting to mount or hold a tool while using it in a project, it will be done so in a way that the tool is not stable, or in a way that the mounting/unmounting of the tool is difficult or time-consuming. There are no products available that can accommodate a variety of tools and where a tool or device can be quickly, easily, and securely fastened and used in a work environment.

SUMMARY DISCLOSURE OF THE INVENTION

Disclosed is a device that attaches to a table, cart, workbench, shelf, or any other flat surface, that allows a user to quickly and securely mount and dismount a large variety of tools (or other items) safely, easily and quickly. Attachment of the device to a workbench can be, for example, through screws, bolts, clamps, adhesive, or other mechanisms. Almost any tool/device that would normally be used on a workbench can be mounted on the device. Examples include planers, grinders, jigs (pocket screw, etc.) vices, drill press, etc.

In embodiments, a tool docking station includes a base, a mounting frame attached to the base comprising some type of latching mechanism to permit mounting and unmounting of a coupling plate configured to hold one or more tools, and including a latch mechanism, wherein the coupling plate is configured to be securely locked down onto the base via the mounting frame, and the latch mechanism.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

Figure 1:
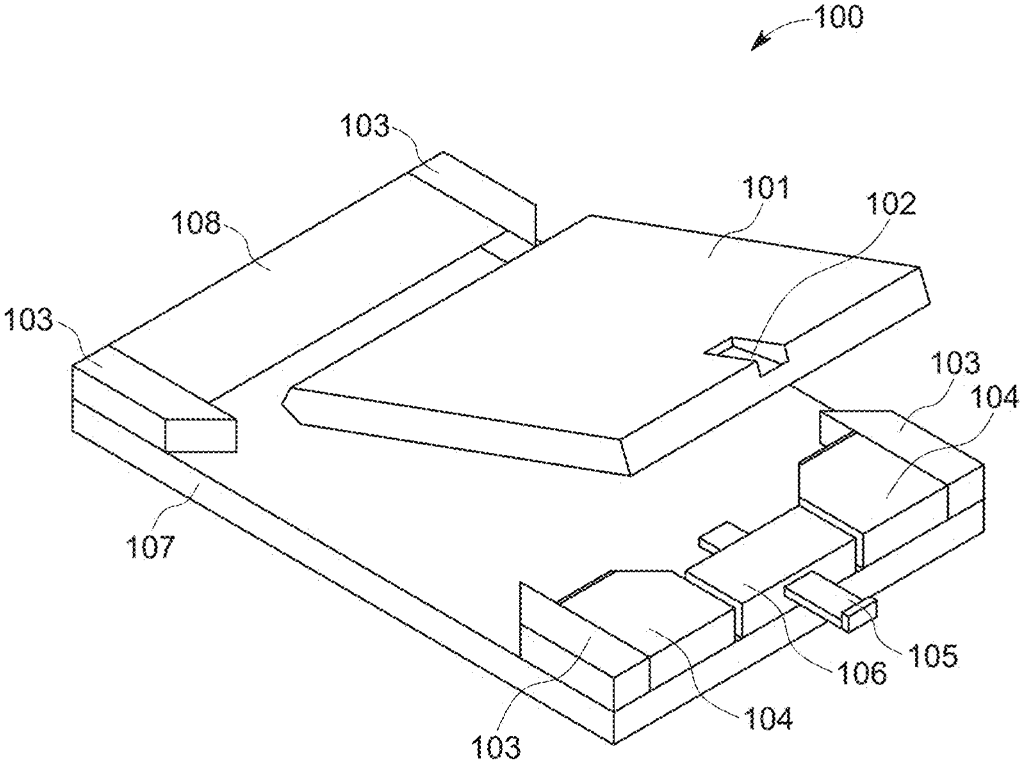
FIG. 1 shows an embodiment of a docking station of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

Disclosed is a device that can be attached to a work bench or any flat surface and that enables various tools or devices, for example, grinders, vices, drill presses, pocket hole jigs, etc., to be mounted and dismounted quickly, easily, and securely. This saves time and valuable workspace while still allowing the safe usage of a variety of different tools and devices by the user.

The universal tool docking station solves a number of problems and issues when working with various tools and other products on a given project.

Lack of valuable work space. In embodiments, the Docking Station has a small foot print and allows tools/devices to be mounted/dismounted very quickly. Therefore, only the tools/devices needed at any given moment can be mounted thereby saving valuable work space. Tools/devices can be stored elsewhere until they are needed. Also, since the docking station itself can be flat it can be unattached and stored away as well.

Time wasted switching tools. Mounting tools/devices to a work surface is cumbersome and time consuming. The Tool Docking Station allows tools/devices to be mounted/dismounted very quickly so no time is wasted trying to figure out how or where to mount a tool in order to use it.

Inability to use the right tool for the job. The disclosed Docking Station allows for the use of a large variety of tools both powered and non-powered. The user is not limited to the tools which are already mounted.

Safety hazards as a result of unstable mounting. It can be very tempting when working on a project to jerry-rig a tool so that it can be quickly used. But this often results in the tool being wobbly, unstable, or not correctly positioned. In addition to causing sub-par results this can also lead to injury. The disclosed docking station locks the tool in snugly and securely eliminating such problems.

Modes for Carrying Out the Invention

The disclosed tool holder or docking station includes the following components as described below.

A base or docking base, in embodiments, can be essentially a flat piece or board which can be made of wood, plastic, metal, composite, or any other rigid material with adequate strength. In one specific example, ¾ inch thick medium density fiberboard (MDF) can be used. The piece can be cut to approximately 20 inches long by 13 inches wide. Nevertheless, the dimensions of the base can be varied according to the needs of the application. For example, the base can vary from about 12 inches to about 48 inches long and about 6 inches to about 48 inches wide.

A latch box and arm can provide a latching mechanism that can, in embodiments, be attached to a frame on the base to secure a coupling plate. The latch mechanism can sit between lock boxes that are part of the frame and can be secured to the base. This can be a basic latch device with a sliding arm.

A mounting frame connects to the base or docking base. In one embodiment, the mounting frame includes four corner blocks, one hinge block, and two locking blocks. In embodiments, the corner blocks can be attached to the top base corners and are positioned such that they secure the coupling plate and prevent it from moving. In embodiments, the corner blocks have one end cut at an angle which allows debris including sawdust, shavings, etc., to slide easily off the base.

The frame can include a hinge block which can be positioned on the base. In embodiments, the hinge block can include a beveled edge. The hinge block, for example, can have a 45 degree angle cut out of its interior side creating a 45 degree concave opening along an adjoining interface of the top of the base and bottom of the hinge block. This beveled edge accepts a corresponding beveled edge of the coupling plate creating a floating hinge which permits the plate to be securely locked down to the base This feature is shown in the drawings.

The frame can also include locking blocks and a latch mechanism. In embodiments, there can be two locking blocks and a latching mechanism that can be attached to the top side of the base opposite the hinge block. To mount a coupling plate to the base, a beveled edge of the coupling plate can be inserted into a hinge block beveled edge or opening, and the opposite end of the plate is then swung down which snugly wedges the plate in between the hinge block and the locking blocks. See FIG. 1. The lock blocks may protrude out beyond the latching mechanism on each side creating a recess for the latch arm so that it does not interfere with the coupling plate as the coupling plate is being inserted. An optional feature of the locking blocks is that the interior front top edge of both blocks can be slightly beveled or rounded to accommodate the coupling plate as it swings down. See e.g., FIG. 4.

The coupling plate is a flat board with dimensions that allow it to fit snugly on the base surrounded by the mounting frame and latch mechanism. A notch on the top of the coupling plate, or a hole bored into its side, can accept a latch arm when the latch is extended and holds the coupling plate down firmly against the base. The notch or hole is on a slight incline so that the further the latch arm is deployed into the notch/hole, the tighter the wedge force is between the latch arm and the plate. The notch or hole also allows the coupling plate to have a smooth uninterrupted top surface which can be useful for some tool mountings and other applications. The coupling plate can also be approximately 20 inches long by 13 inches wide. Nevertheless, the dimensions can be varied according to the needs of the application. For example, the coupling plate can vary from about 12 inches to about 48 inches long and about 6 inches to about 48 inches wide.

Figure 5:
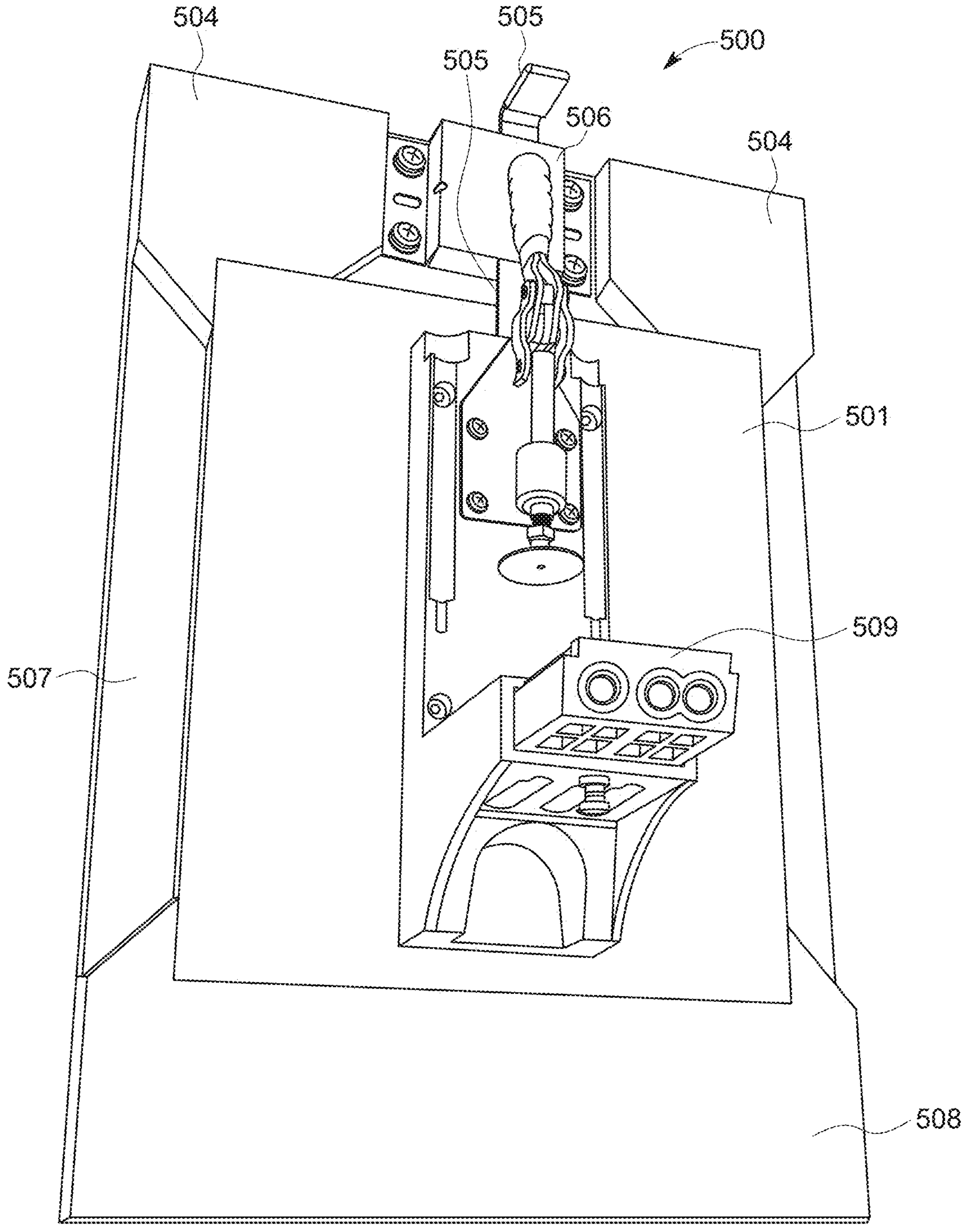
FIG. 5 shows another embodiment of a docking station of the disclosure with a tool attached to the coupling plate.

Devices/tools can be attached to the coupling plate via screws, bolts or other mechanisms. The attachment mechanism can be specifically suited for the device being attached. One coupling plate can be used for each tool/device. FIG. 5 shows an example of a tool (a pocket hole jig) attached to a coupling plate. Various tools and devices can be attached to a coupling plate. The coupling plate(s) with tools attached can then be quickly, easily, and securely, swapped in and out of the docking station.

A feature of the coupling plate is that it can have one end or edge that is beveled. The bevel can be created by a 45 degree cut along the top edge and another 45 degree cut along the bottom edge of one end of the coupling plate. The coupling plate may not function properly with only one 45 degree angle as it may not be able to fit into the docking base frame assembly. Tapering the lock blocks and beveling the coupling plate can enable the plate to go onto the base easily while simultaneously achieving a secure fit.

The docking base to coupling plate fit can also be achieved by other hinge block to coupling plate shapes such as having a rounded concave opening on the hinge block and a convex rounded edge on the coupling plate.

The floating hinge created by the angled hinge block and the beveled coupling plate allows tools to be quickly, easily and securely mounted and the tools can be just as easily unmounted. The beveled edge of the Coupling Plate allows the plate to swing freely when being inserted into the hinge block's 45 degree opening and also locks down the plate when fully lowered onto the docking base. A feature of the locking blocks is that the interior front top edge of both blocks can be slightly beveled or rounded in order to be able to accept the coupling plate as it swings downward. The corner blocks are cut at an angle that allows any sawdust, shavings or other debris created by whatever tool is being used to fall easily off the base.

Each tool/device can be mounted to an individual coupling plate which allows the tools/devices to be easily stored when not mounted to the docking station. Nevertheless, when appropriate, multiple tools or devices can also be attached to a coupling plate as well. The docking station can be flat and when detached from the work surface can thus be easily stored. Tools can be securely mounted and unmounted in seconds. Anything that can be secured to a coupling plate could be mounted on the docking station. The design of the docking station ensures that the coupling plate is aligned with the base for proper mounting as soon as the beveled edge of the plate is inserted into the hinge block. The latch mechanism, in conjunction with the floating hinge, quickly and easily secures the coupling plate to the base with one simple motion. Few moving parts means that there is very little opportunity for mechanical failure. The coupling plate's attachment to the docking base is extremely secure allowing for heavy devices/tools to be mounted.

The docking station can be attached to any desired flat surface, horizontally or vertically. Attaching the docking station on an adjustable shelf allows for work to be done at a variety of heights. The docking station can be attached to a surface permanently or in a temporary fashion, using clamps for example, which makes it very versatile.

One way to utilize the docking station would be to attach it to adjustable shelving brackets. In this way the station (and mounted tools) can be adjusted to a variety of different heights to suit individual users and the tools they are using.

The device could be constructed of any rigid material—i.e. plastic, MDF, wood, metal, etc. In one example, MDF and plywood can be used. The frame could be assembled using the separate components listed, or as one piece and a latch. That is, the frame could be integrally formed.

Since the latch is the only moving component of the docking station (the coupling plates are separate) everything else could be combined into one piece or a few pieces. The device can be made to whatever dimensions are appropriate for its intended use. For example, using it for working on fishing flies might benefit from a smaller device whereas using it to mount a drill press might require larger dimensions.

One of the features of the device, the floating hinge, is achieved by a concave opening in the hinge block cut at a 45-degree angle and a beveled coupling plate. The same results could be achieved by using a rounded concave opening in the hinge block and a convex rounded edged coupling plate. Tools/devices can be attached to the coupling plate in a variety of ways including screws, bolts, or other secure fasteners. The base can be attached to any flat surface using suitable fasteners such as screws, bolts, adhesives, clamps, etc.

In embodiments, the frame may consist of, or consist essentially of, a hinge block, one or more corners, one or more lock blocks, and a latch block as disclosed above. In embodiments, the frame may be integrally formed.

In practice, a user attaches a tool to the coupling plate. This can be done using screws, bolts, clamps, adhesives, etc., in one embodiment, one tool may be attached to one coupling plate. The coupling plate, with tool attached, is then securely inserted into the base and frame via the beveled, rounded, or concave edge of the tool docking station's hinge block and beveled, rounded, or concave edge of the coupling plate.

The coupling plate is then locked down to the base and frame via a latching mechanism. As mentioned, a single tool may be attached to a single coupling plate. Therefore, a variety of tools can be easily and securely docked to the docking station by attaching and detaching coupling plates with attached tools to the docking station. This allows a variety of tools to be attached and detached to the docking station while in use in a given project.

The disclosure provides methods of using a docking station, as described above, which includes: attaching one or more tools to a coupling plate; attaching the coupling plate to a docking station; wherein the coupling plate is securely inserted into a frame on a base of the docking station. The method may include the coupling plate being secured via a latch mechanism connected to the frame and the coupling plate.

FIG. 1 shows an embodiment of a docking station of the disclosure. FIG. 1 shows docking station 100; coupling plate 101; receiving notch for latch arm 102; corners 103; Lock blocks 104; latch arm 105; latch block 106; base 107; and hinge block 108.

Figures 2, 3, 4:
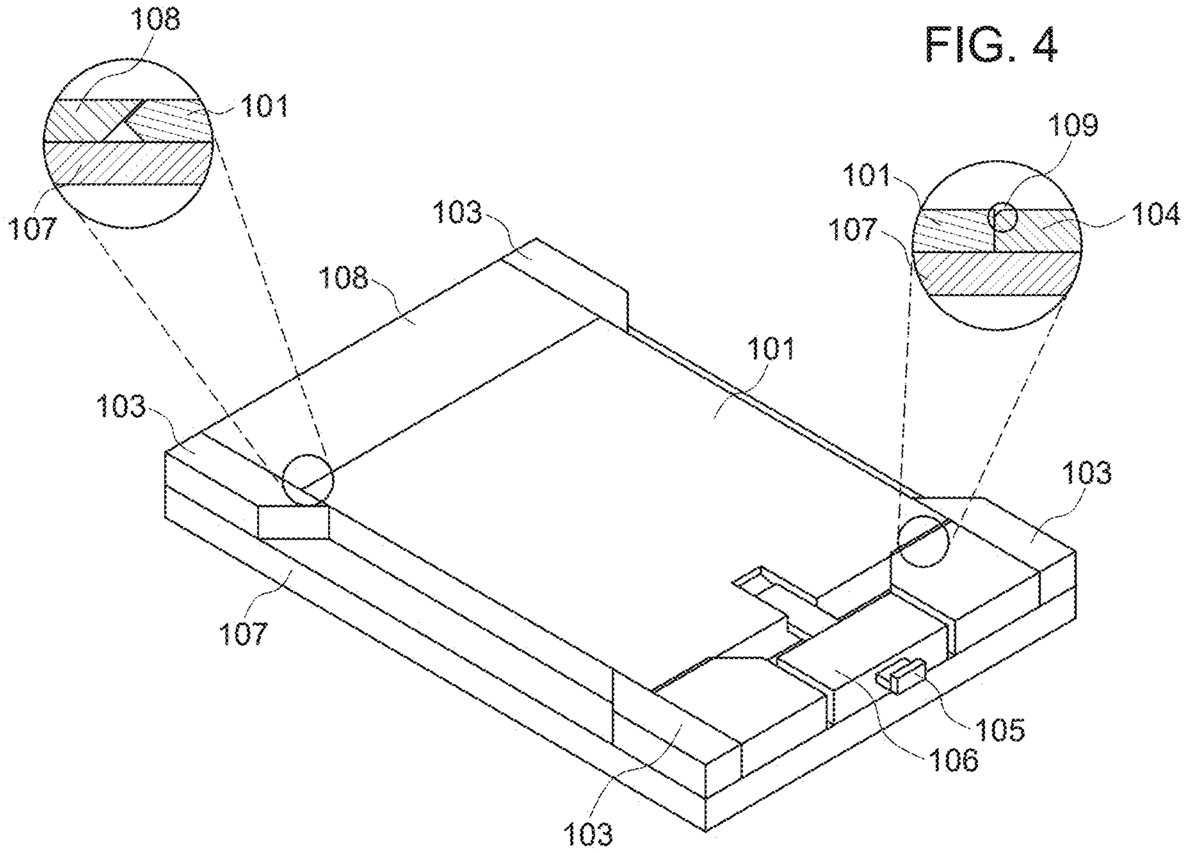
FIG. 2 shows an embodiment of a docking station with a fully seated coupling plate.
FIG. 3 shows an exploded view of an embodiment of a hinge Block/coupling plate interface.
FIG. 4 shows an exploded view of an embodiment of a lock block/coupling plate interface.

FIG. 2 shows an embodiment of a docking station with a fully seated coupling plate. The reference numbers in FIG. 2 correspond with those in FIG. 1.

FIG. 3 shows an exploded view of an embodiment of a hinge Block/coupling plate interface. The reference numerals and FIG. 3 correspond with those in FIG. 1.

FIG. 4 shows an exploded view of an embodiment of a lock block/coupling plate interface. FIG. 4 shows a rounded top edge 109 of the lock block 104.

FIG. 5 shows another embodiment of a docking station of the disclosure with a tool attached to the coupling plate. FIG. 5 shows docking station 500; coupling plate 501; lock blocks 504; latch arm 505; latch block 506; base 107; and hinge block 508.

GLOSSARY

A mounting frame as disclosed herein refers to a frame that is disposed on the base and holds the coupling plate in place. Generally speaking, any structure that can securely hold the coupling plate in place is contemplated.

More specifically, the mounting frame can include a hinge that is configured to couple with the frame and hold the frame in place. In addition, corner blocks, lock blocks, and a latch block, can be included which serve to securely hold the coupling plate in place. In one embodiment, a hinge block, the corners, the lock blocks, and the latch block can be collectively referred to as the mounting frame. In an embodiment, the entire frame can be integrally formed.

As shown in the drawings, the corner blocks, lock blocks, and latch block are members that collectively form a frame disposed on the base and that surround and hold the coupling plate. The corner blocks work in conjunction with the lock blocks and hinge block to securely hold the coupling plate in place. The corner blocks in conjunction with the lock blocks secure two edges or sides (typically at 90 degree angles) of the coupling plate. This can be seen in FIGS. 1 and 2. The hinge and hinge block provide the ability to quickly and conveniently swap in and out coupling plates (with various tools and devices attached). As mentioned, the hinge block, corner blocks, and lock blocks securely hold the coupling plate. The latch block functions similarly to the lock blocks but also provides the latch or latch mechanism. The latch block, lock blocks, and corner blocks may be separate members or may be integrally formed in any combination.

A hinge is provided by a concave opening cut at a 45-degree angle that corresponds with or matches a beveled coupling plate. The same results could be achieved by using a rounded concave opening in the hinge block and a convex rounded edged coupling plate.

The term bevel or beveled as used herein is an edge of a structure that is not perpendicular to the faces of the piece. Thus, an angle that one surface or line makes with another when they are not at right angles. Two pieces fit together by a bevel will generally refer to the two pieces having corresponding edges, not perpendicular to the faces of the respective pieces, that match or fit together.

A coupling plate as referred to herein is generally a flat board with dimensions that allow it to fit securely on the base surrounded by the mounting frame and latch block and mechanism. The coupling plate is configured to have tools securely mounted onto its surface in a manner which they can be easily mounted or dismounted as needed by a user.

A "secure" fit as referred to herein, in particular, for the coupling plate held within the frame, refers to the coupling plate being locked in place by the frame with no opportunity to move either back-and-forth or up and down to any noticeable (by the user) degree. That is, once the coupling plate is "securely" locked in place by the latching mechanism it will not move, even when tools are attached to the coupling plate or the entire structure is moved to a different position on a workbench, etc.

A latch and latch mechanism as referred to herein generally refers to a type of mechanical device that can be used to lock or secure the coupling plate in place within the frame. Generally speaking, any latch, bolt, or other mechanical device commonly used in the art for holding a piece in place and that can be attached to the frame and that can secure the coupling plate can be used.

While this disclosure includes specific examples, it will be apparent after an understanding of the disclosure of this application has been attained that various changes in form and details may be made in these examples without departing from the spirit and scope of the claims and their equivalents.

The invention claimed is:

1. A method of docking tools on a tool docking station, the tool docking station comprising:

a base, a mounting frame attached to the base comprising a hinge comprising a beveled, rounded, or concave edge, a hinge block comprising the hinge, four corner blocks, two lock blocks, and a latch block comprising a latch mechanism;

a coupling plate comprising a beveled, concave, or rounded edge wherein the coupling plate is securely held onto the base by the hinge block, the corner blocks, the lock blocks, and the latch mechanism;

wherein the latch mechanism is configured to connect the mounting frame to the coupling plate;

the method comprising the steps of:

attaching a tool to the coupling plate;

attaching the coupling plate to the base via the mounting frame hinge comprising the beveled, rounded, or concave edge and the coupling plate beveled, concave, or rounded edge; and holding the coupling plate to the base and the frame with the latch mechanism.

2. The method of claim 1, wherein the hinge block comprises one end that is beveled by a 45 degree cut along a top edge; and the coupling plate has a corresponding beveled 45 degree cut along a bottom edge.

3. The method of claim 1, wherein the two lock blocks comprise a rounded or beveled edge.

4. The method of claim 1, wherein the mounting frame and the coupling plate comprise wood, plastic, metal, or a composite.

5. The method of claim 1, wherein the mounting frame is integrally formed.

* * * * *